United States Patent
Li

(10) Patent No.: US 7,020,257 B2
(45) Date of Patent: Mar. 28, 2006

(54) VOICE ACTIVITY IDENTIFTICATION FOR SPEAKER TRACKING IN A PACKET BASED CONFERENCING SYSTEM WITH DISTRIBUTED PROCESSING

(75) Inventor: Dunling Li, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 436 days.

(21) Appl. No.: 10/123,483

(22) Filed: Apr. 17, 2002

(65) Prior Publication Data

US 2003/0198328 A1 Oct. 23, 2003

(51) Int. Cl.
*G10L 21/02* (2006.01)

(52) U.S. Cl. .............................. 379/202.01; 379/201.01

(58) Field of Classification Search ............ 379/202.01, 379/93.22, 201.01, 204.01, 203.01, 205.01, 379/158; 704/210
See application file for complete search history.

(56) References Cited

U.S. PATENT DOCUMENTS

| 6,415,253 | B1 | * | 7/2002 | Johnson | ..................... 704/210 |
| 2003/0014857 | A1 | * | 1/2003 | Wang | |
| 2003/0061042 | A1 | * | 3/2003 | Garudadri | |
| 2003/0112796 | A1 | * | 6/2003 | Kwan | |
| 2003/0129956 | A1 | * | 7/2003 | Virolainen | |

FOREIGN PATENT DOCUMENTS

DE    WO 98/40974    * 9/1998

* cited by examiner

*Primary Examiner*—William J. Deane, Jr.
(74) *Attorney, Agent, or Firm*—Abdul Zindani; Wade James Brady, III; Frederick J. Telecky, Jr.

(57) ABSTRACT

A distributed conferencing system has a plurality of conferencing nodes to connect groups of participants to a conference. Each of the conferencing nodes provides for the connection of one or more participants to the conference. Each node includes a DSP for distributed signal processing. The node DSP includes: A signal measuring device for measuring features of the signals from each of the participants such as power, zero crossing rate and short term energy. The nodes include voice activity determination and a communication device for communicating the measured signal characteristics for a plurality of participant input signals to all other conferencing nodes. Muting means for muting individual participant input signals so that only selected signals are transmitted over the conference bus to the other participants. The voice activity detection utilizes a state machine with three states, voice state, transition state and noise state, dependant upon the measured energy level, zero crossing rate and other features of the signals. A high threshold and a low energy threshold; zero crossing rates; average energies; energy level means and variances and other features are used in differentiating voice and noise. The state machine will not move directly from voice to noise state but will move to a transition state first, to reduce the likelihood of missclassification of a weak voice signal as noise and to avoid frequent clipping which can be caused if the state machine moves to noise state during brief pauses in voice.

19 Claims, 9 Drawing Sheets

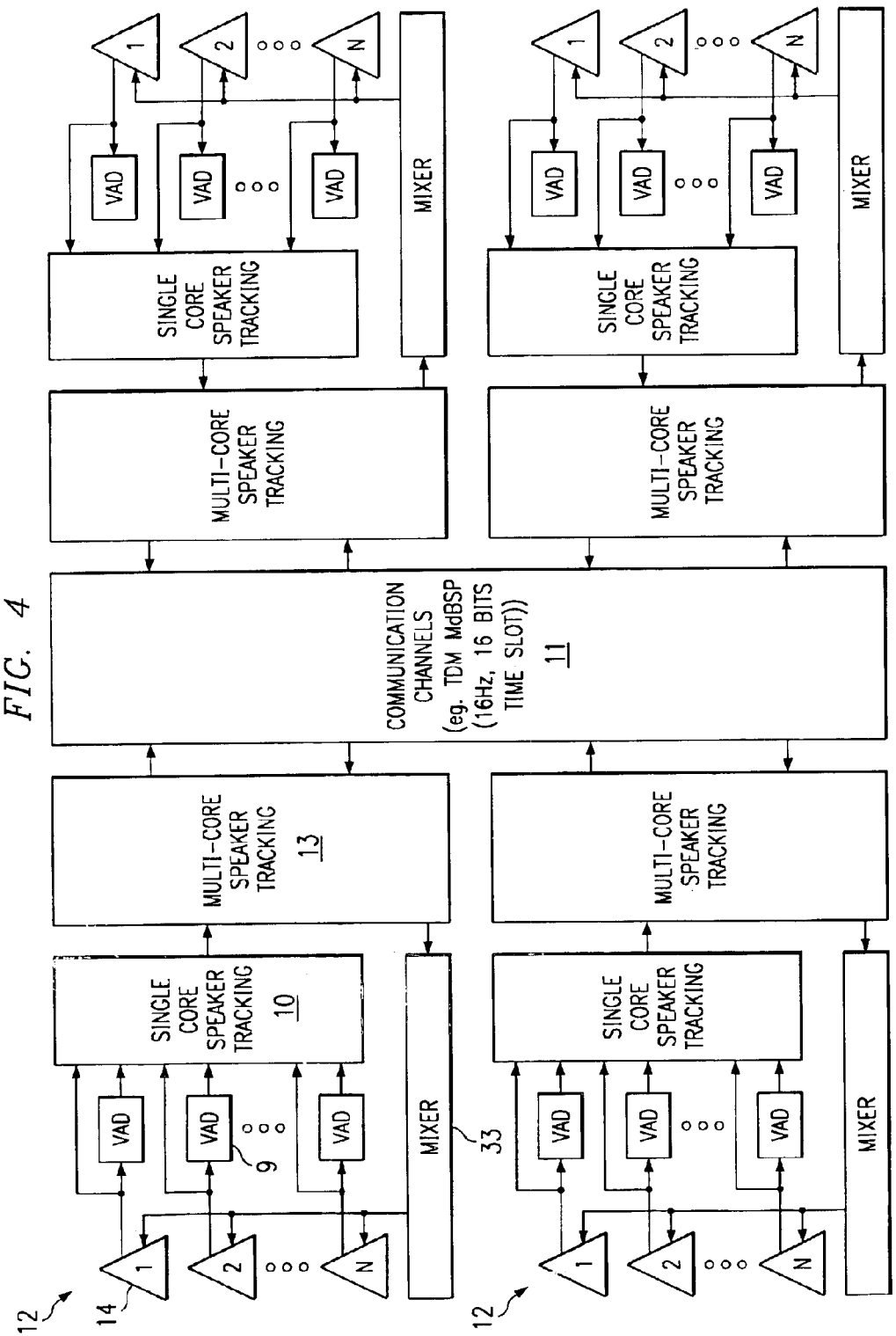

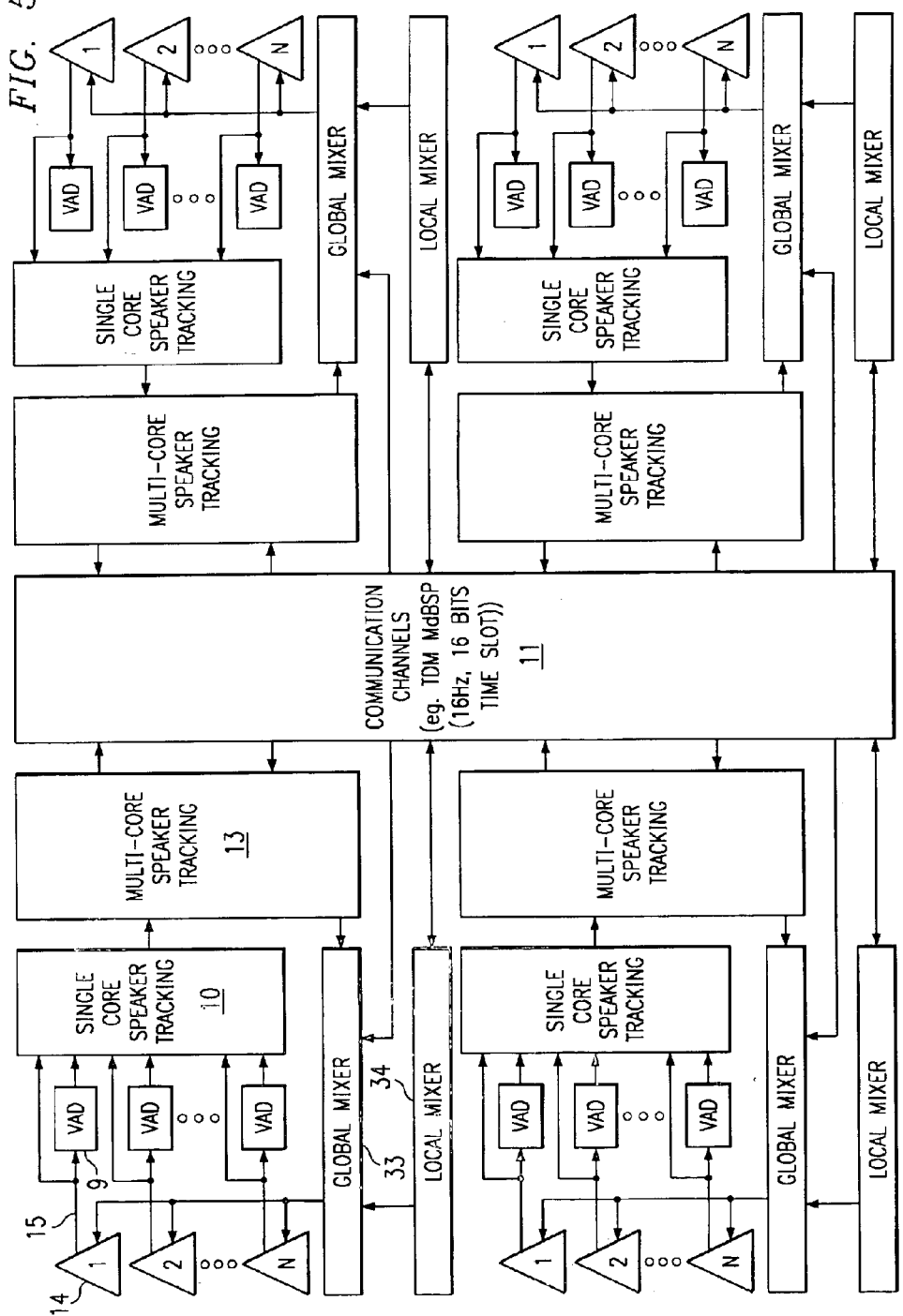

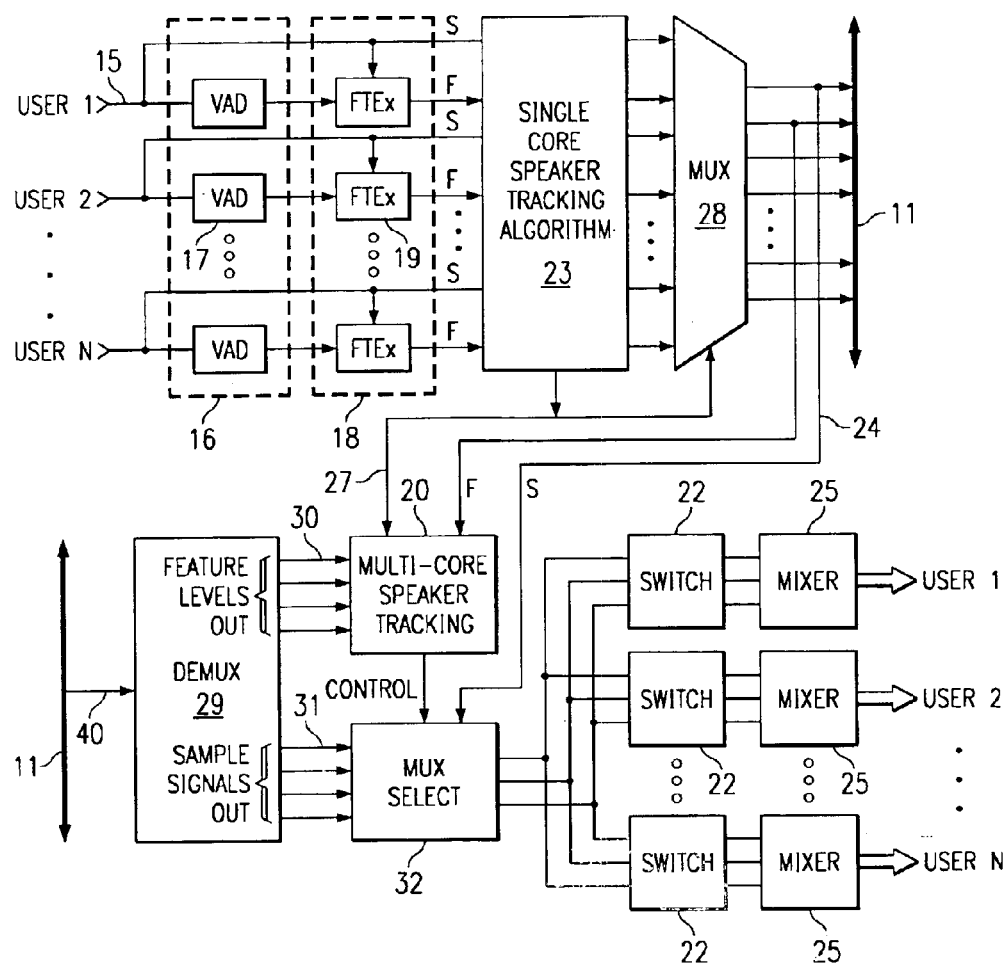
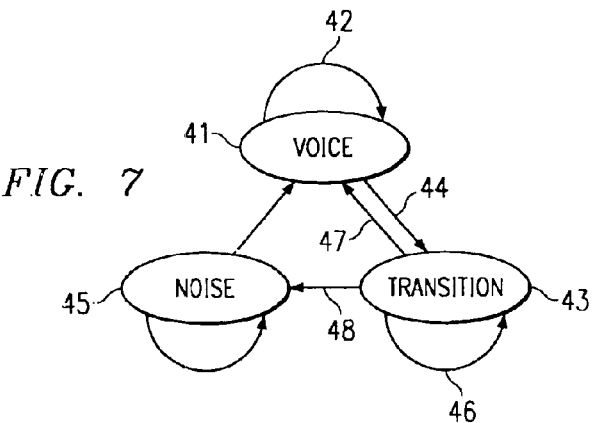

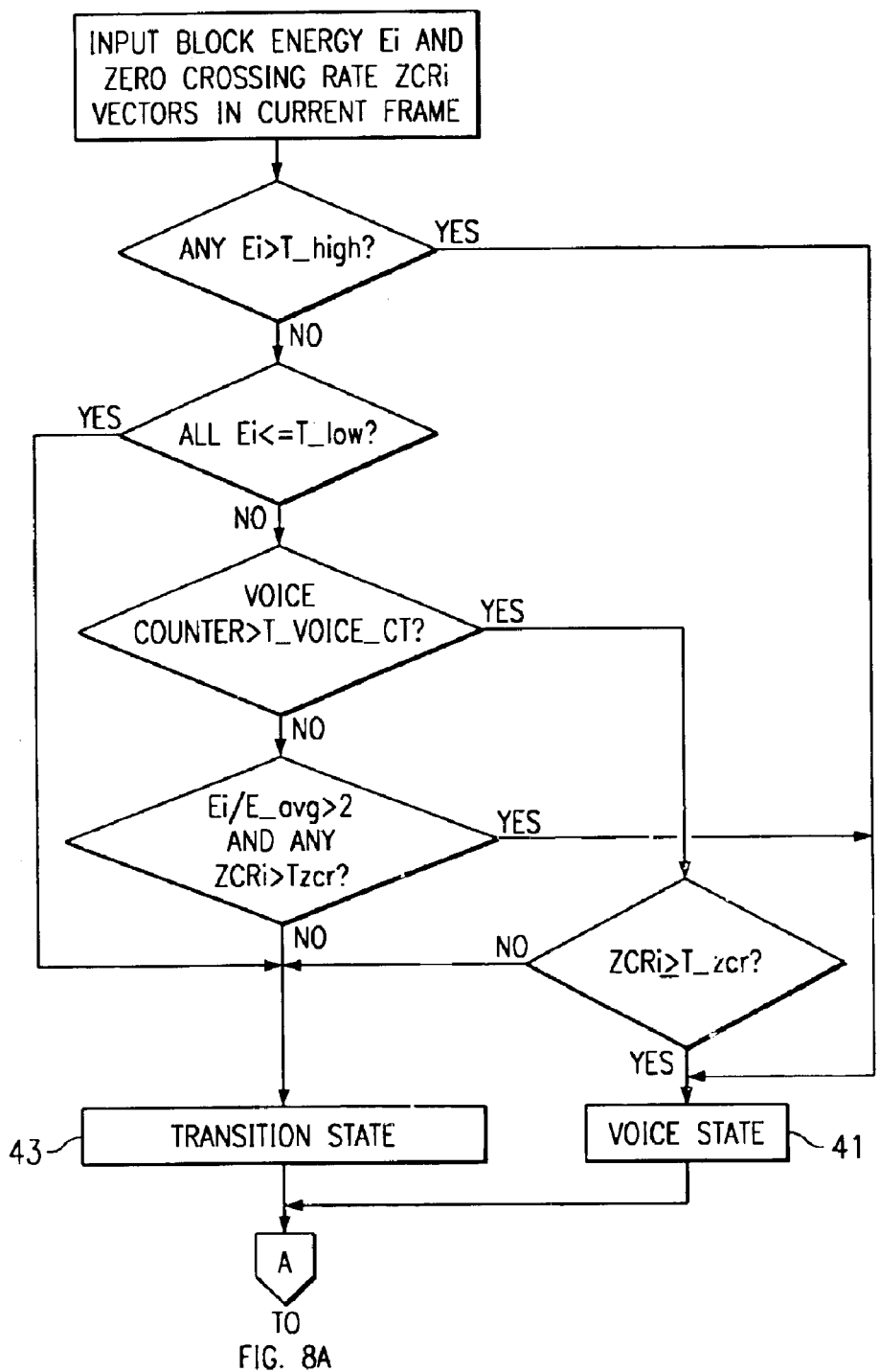

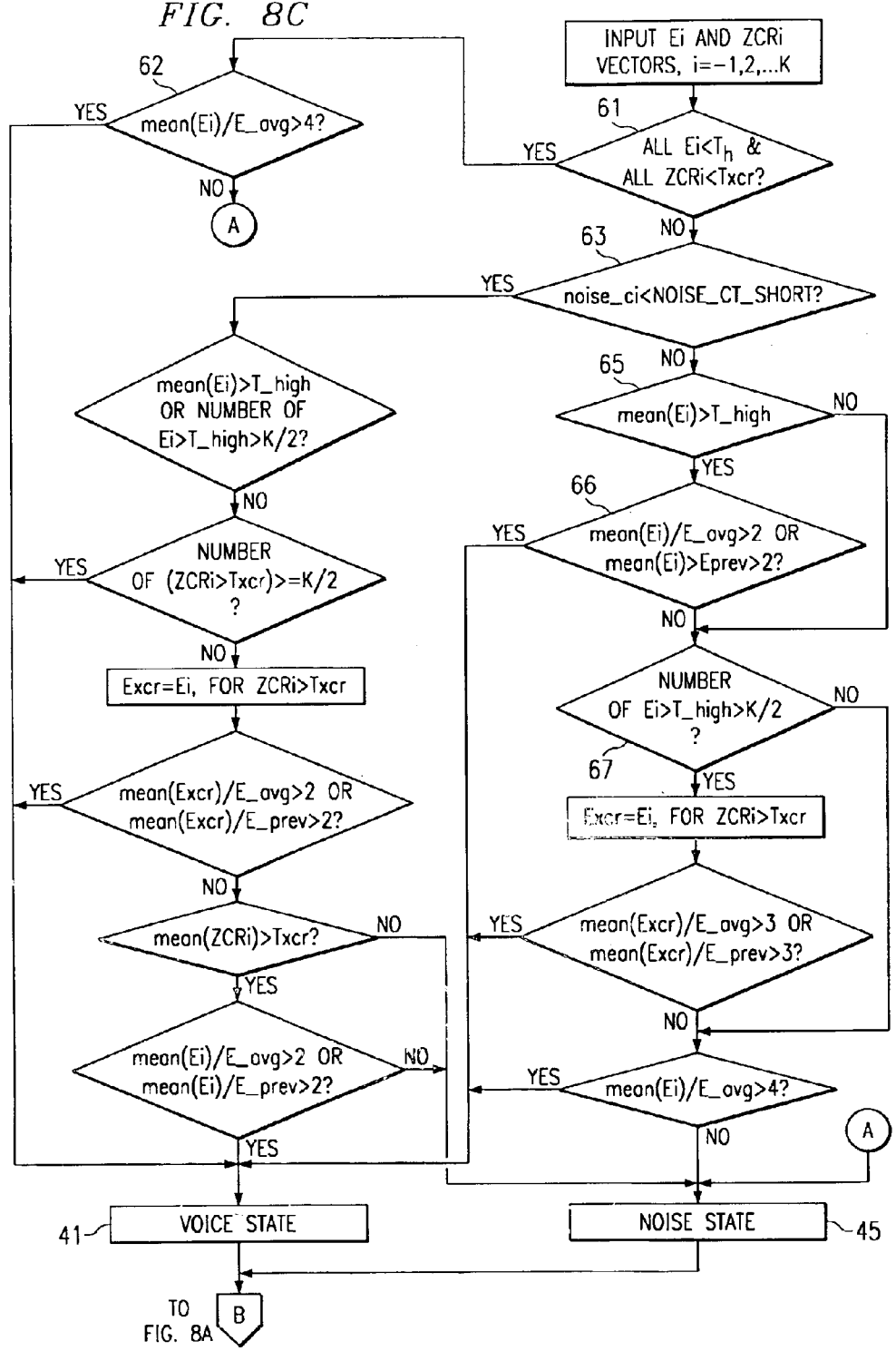

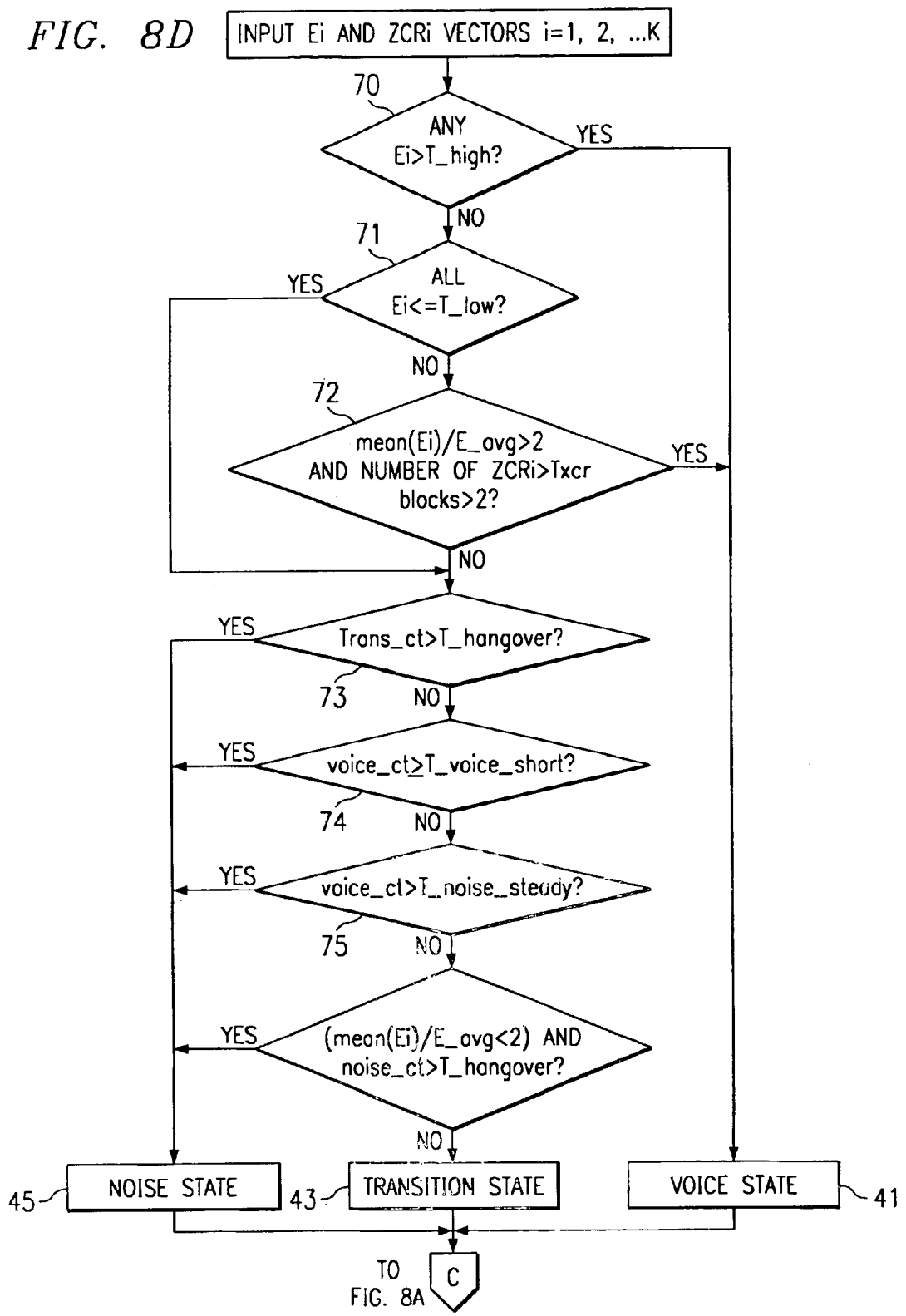

VOICE ACTIVITY IDENTIFITCATION FOR SPEAKER TRACKING IN A PACKET BASED CONFERENCING SYSTEM WITH DISTRIBUTED PROCESSING

CROSS REFERENCE TO RELATED APPLICATIONS

None

FIELD OF THE INVENTION

The invention relates to voice tracking for telephony conferencing over packet networks. More specifically, the present invention relates to the identification of voice activity for tracking of individual speakers for improved performance in a packet based conferencing system.

BACKGROUND OF THE INVENTION

Conferencing allows multiple users to participate in the same call on a dynamic basis. A single call can be established and additional users can be added or deleted on a dynamic basis.

FIG. 1 illustrates a representative prior art digital telephony conferencing system. The conferencing system consists of numerous participants at locations 1 through n. One or more telephones 5 may be located at each location. A multiplexing and demultiplexing device 4 connects each of the telephones to the conference bus 3. Some locations may have only a single user, while other locations may have multiple users. Each user will be individually connected through a multiplexer 4. A time-division multiplexing (TDM) bus 3 conveys the signal information generated by each participant to all other participants of the system.

FIG. 2 illustrates the use of a single core for processing the signals from the various locations illustrated in FIG. 1. All of the telephones 5 are connected to a common core, such as a DSP core 7. The DSP core 7 has a number of channels, each participant telephone 5 is accommodated by a channel. Each channel acts as a router for receiving the audio signals from the telephone connected to the channel. The core 7 also has a plurality of mixers 8 for providing audio signals out to each of the telephones 5. The mixer for each telephone sums the signals for all other telephones and provides this signal to the particular telephone served by that mixer. The mixer does not provide a telephone with its own signal because the speaker would hear an echo of his own voice.

Each of the signals from each of the telephones has noise associated with the signal. The noise can be background noise or other noise. The mixing operation, a summation of all signals, causes the noise level to increase at each of the telephones. The increase in noise can limit the number of participants and/or can have an adverse impact on the quality of the communication.

The use of a single core for a conference call also reduces the total number of participants which is limited by the number of channels on a single core. Further, the transmission of background noise, as well as the transmission of other speakers in addition to the primary speaker places an additional load on a communications system.

When a large number of people participate in a telephony conference, there is a significant likelihood that two or more participants will speak at the same time. It is also likely that background noise originating at one or more group nodes will be transmitted through the conferencing system. The transmitted signals of the background noise and multiple speakers interfere with the signal that is of interest to the conference participants. These interfering signals impair the ability of the conference listeners to hear and understand the speaker that is of interest to them and thereby reduce the quality of the communication.

SUMMARY OF THE INVENTION

The present invention reduces the unnecessary use of communication resources to support the communication of signals that will ultimately be muted and reduces the processing demands on a conferencing system.

The use of distributed processing and multiple cores by the present invention allows the number of conferencing nodes to be greater than the number of channels on a single core. All of the conferencing nodes may be set up at different cores. Alternatively, some of the cores of the distributed system may support more than one node. The bandwidth for communication between cores is less than the bandwidth within a single core. The limitation on communication bandwidth is addressed by the present invention. The present invention teaches active speaker tracking and mixing operation for improved performance in distributed multi-core conferencing Systems.

The present invention teaches low-delay voice activity detection. The present invention can be utilized for speaker tracking implemented for speakers from a single core and speaker tracking for speakers from multiple cores. The mixing operation is optimized based upon speaker tracking to reduce the cumulative noise summing effect and a communication algorithm which provides effective system control.

The system of the present invention is implemented with low complexity to minimize processor and memory resource requirements. The present invention provides high quality communications capable of tolerating a significant range of noise conditions.

A distributed intelligence conferencing system, as illustrated in FIG. 3, is disclosed, having a plurality of conferencing nodes 12 connected to a communication bus 11. Each of the conferencing nodes can connect one or more participants to the conference and has feature measuring devices for measuring various features of a signal, such as power level, zero crossing rate on each of a number of participant input signals; a processing device, interconnected with the feature measuring device, for determining the relative features of each of the number of participant input signals; and a communication device, interconnected with the processing device, for communicating the measured features and the signals for a plurality of participant input signals to the other conferencing nodes.

Each node 12 of the system measures the features of each of the conference participants connected to that node. The processor in the node identifies the significant participants based upon the measured features. The three significant signals are identified in the exemplary embodiment, however, a greater or lesser number may be identified depending on the implementation of the present invention. Each node 12 provides the signal features and signal sample of its three significant participant signals to the other nodes through the bus 11. The nodes then compare each of the three significant local signals to the features of the received signals and determines if the local signals should be included in the conferencing group signal provided to the participants in the conference.

BRIEF DESCRIPTION OF THE DRAWINGS

Exemplary embodiments of the present invention are discussed with reference to the following drawings:

FIG. 4 is a block diagram of the functional configuration of an exemplary distributed conferencing system of the present invention showing additional block detail.

FIG. 5 is a block diagram of the functional configuration of an exemplary distributed conferencing system of the present invention showing additional block detail.

FIG. 6 is a block diagram illustrating an exemplary representative structure of a conferencing node of the conferencing system of the present invention.

FIG. 7 is a state diagram illustrating the voice activity detection states of the present invention.

FIGS. 8A–8D are a logic flow diagrams illustrating the voice activity detection of the present invention.

DETAILED DESCRIPTION OF THE INVENTION

Figure 1:
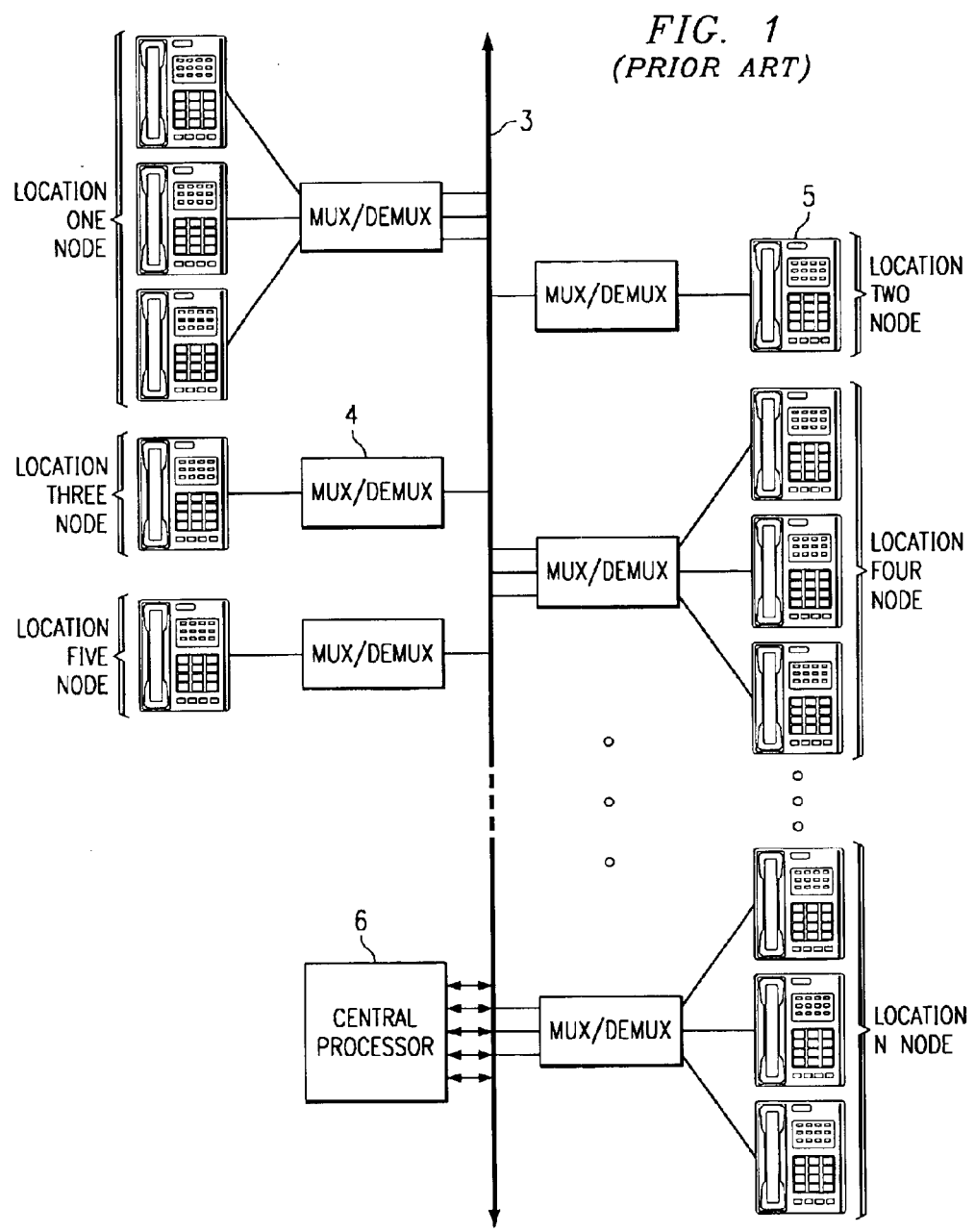
FIG. 1 is a block diagram illustrating a representative prior art digital telephony conferencing system.
Figure 3:
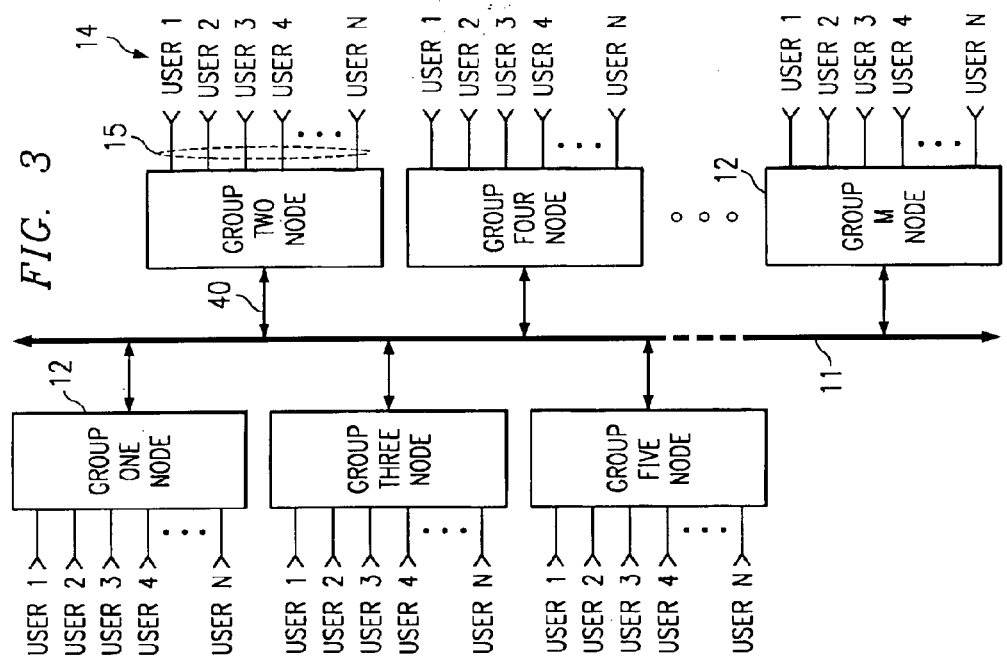
FIG. 3 is a simplified block diagram illustrating a representative conferencing system of the present invention.
Figure 2:
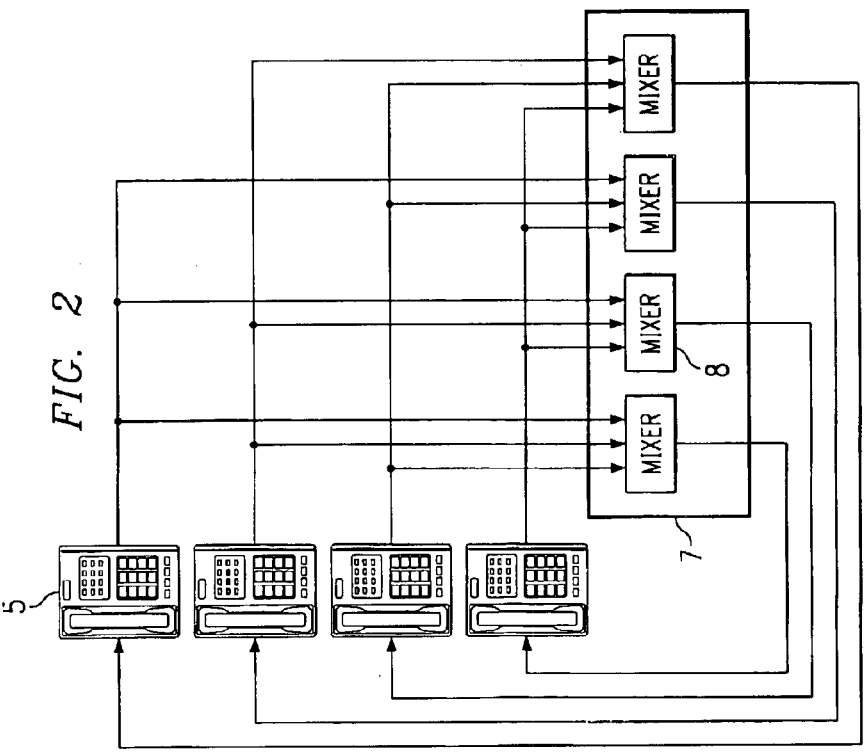
FIG. 2 is a block diagram illustrating the use of a single core for mixing and processing signals from various locations.

FIGS. 3, 4 and 5 illustrate a representative conferencing system of the present invention. FIG. 3 illustrates the overall physical structure. FIGS. 4 and 5 illustrate the overall functional or logical components of exemplary embodiments of the present invention. The conferencing system contains a number of conferencing nodes 12 identified by their respective group numbers group 1 through group n. Each node 12 is capable of providing conferencing support to multiple participants or users 14 that are connected to the node 12 by separate communication channels 15. Communication between the multiple nodes 12 is accomplished via a bus 11. The bus can be for example a TDM bus.

FIG. 4 also illustrates the voice activity detection 9, single core speaker tracking 10 and multiple core speaker tracking 13 within the DSP core. In the exemplary embodiment of FIG. 4, there is no local mixing of the speaker signals. The mixer 33 mixes the signals for each of the users 14 from the multi-core tracking 13 after communication from the TDM bus 11. FIG. 5 illustrates an embodiment with local mixing 34 as well as the global mixing 33.

FIG. 6 illustrates an exemplary representative structure of a conferencing node 12 in greater detail. A number, n, of separate participants or users 14 are connected to this node 12 by communication channels 15. In an exemplary embodiment of the invention, node 12 is comprised of a DSP that is capable of supporting a number of communication channels 15. Each channel connects one of the users 1-n to the DSP. Each DSP may provide communication to one or more participants, depending on how many users are connected. In the exemplary embodiment, voice activity detection module 16 of the DSP, has voice activity detection 17 capabilities and receives the signals on the communication channel. The signal 5 is also feed directly to the single core speaker tracking algorithm 23 and to the feature extraction module 18 which has feature extraction capabilities FTEx 19, to measure features such as the power, short term energy, long term energy, zero crossing level and other desired features of the signal on each communication channel 15 during some portion of the frame period, τ. In a preferred embodiment, the features are periodically obtained during each 2.5 msec of a frame period. The decision, ie voice or not voice v/n, from each VAD 17 is also sent to its respective FTGEx19.

Based upon the determination of the VAD, the FTEx will extract features from the signal if the signal has been identified as voice. The features fare sent to the single core speaker tracking algorithm 23 along with the signal 5.

The extracted features f corresponding to the signals 5, are provided to a single-core speaker tracking algorithm 23. The present invention recognizes that the feature extraction and signal from the individual participants may require signal processing, such as commonly applied to remove distortion or hystorisis. Single-core speaker tracking algorithm 23 compares all of the features of each of the users 15 provided to single-core algorithm 23 from module 18 that were measured during frame period τ and processes the information as described below in reference to FIGS. 7 and 8. Although the preferred embodiment of the invention identifies a certain number of signals for tracking, a different number of signals may be identified depending upon the specific implementation of the present invention. Once the single core speaker tracking algorithm has made its determinations, the output of the single core speaker tracking algorithm 23 is output 27 both to the multi-core speaker tracking algorithm 20 and to the multiplexer 28. Multiplexer 28 also receives the signals 5 and the extracted features f from the participants connected to the node. Multiplexer 28 mutes selected ones of the signals based upon the results of the speaker tracking algorithm. The muted signals are not placed on the conference bus 11, 50 that the conference listeners, including those in the current node, will not hear these signals. The non-muted signals and their associated features are placed on the conference bus 11 by the multiplexer 28.

Multi-core speaker tracking algorithm 20 receives the results 27 of the single core speaker tracking algorithm 23, receives the extracted features f of the signals passed by the Multiplexer 28 and also receives measured feature information 30 pertaining to other participants in other groups of conference participants that are connected to other conference nodes of the system. The feature information from participants at other nodes is provided to multi-core algorithm 20 through the bus lines 30 connecting it to a demultiplexer 29. The features of signals from other nodes is used to compare with the feature measurements of the signals from the current node to determine which signals from which participants connected to the conference will be transmitted to the participants 1 through n of the current node. A control signal CNTL is sent to the multiplexer 32 to instruct the multiplexer 32.

Demultiplexer 29 receives the TDM frame 40 from the TDM bus 11 and demultiplexes the feature information and selected signals provided by the other nodes. The feature level information is provided to multi-core algorithm 20 on data lines 30 and the selected signals are provided to multiplexer selector 32 on data lines 31. Multiplexer 32 provides the signals to an input of each of the switches 22 which in turn provide the signals to mixers 25 which in turn provide an input to an associated user. The switches 22 exclude the signal corresponding to the associated user, if such signal is included in the aggregate from the multiplexer 32. The mixers 25 provide the aggregate of all participant signals as an input to each associated participant's telephone, except for the input signal generated by the associated participant himself, to avoid an echo of one's own signal. A participant does not receive his or her own signal, just as one does not receive his or her own signal in the telephone speaker for any other type of telephone call.

Multiplexer 32 receives signals of participants from other nodes on lines 31 and signals of the current node participants 5 on line 24 from the multiplexer 28. Multiplexer also receives control signal CNTL from multicore speaker tracking algorithm 20. Based upon the control signal, multiplexer 32 send the selected signals to the participants of the current node through switches 22 and mixers 25. Because the signals sent from the multiplexer 32 may contain the signals of participants on the current node, switches 22 mute any signals which correspond to the user to which the switch is connected. Mixers 25 then mix the remaining signals and provide the signals to the users 1-n.

Each node separately pre-screens (single-core speaker tracking) the signals of the local participants, reducing the number of samples transported by the communications system. Because each node need only process up to three local signals and up to three signals from remote nodes, the total system processing bandwidth resources needed to support a conference call is distributed, can be conduced in parallel, and is reduced.

Speaker tracking consists of identification of the presence of speech on a signal from a particular participant and determining the relative strength or volume of that speaker compared to active speakers. Speaker tracking is used to identify the speakers of interest for transmission in the conference and for muting of other signals from other speakers.

In order to implement speaker tracking, voice activity detection must be properly implemented. In an exemplary embodiment, a low delay VAD with a configurable fixed energy threshold, as illustrated in FIGS. 7 and 8 can be utilized. The VAD utilizes a 2.5 ms block for power measurements and zero crossing rate for identification of the beginning and end of speech. Each VAD frame can be divided into n blocks. The VAD makes decisions using 2.5 ms previous samples and current frame samples.

As illustrated in FIG. 7, the VAD has three states, Voice 41, Transition 43 and Noise 45. The state of the VAD is dependant upon the measured energy level $E_i$ of the current signal block and the zero crossing rate and their distribution. A high threshold $T_{high}$ and a low threshold $T_{low}$ are used to differentiate voice and noise. Any signal energy blocks in the current frame above the high threshold $T_{high}$ are classified as voice. Signal block energies in the current frame below the low threshold $T_{low}$ are classified as noise. Signals between the two thresholds can be noise or voice and will be classified dependant upon the state of previous signal frame, background energies, zero crossing rates and their characteristics.

When in voice state 41, the VAD can remain in voice state or move to transition state. If the current $E_i$ is above the high threshold $T_{high}$ than the VAD will remain in voice state 41. If all the $E_i$'s of the current frame are below the low threshold $T_{low}$, than the VAD will move to transition state 43 from which it can move to noise state 45. The VAD will not move directly to noise state 45 to reduce the likelihood of missclassification of a weak voice signal as noise and to avoid frequent clipping which can be caused if the state machine moves to noise state during brief pauses in voice.

When in voice state 41, the state will remain voice state as indicated by arrow 42 when:
(a) any block energy ($E_i$)>high energy threshold (Th), or;
(b) voice counter>voice count threshold (Tvc) and current $ZCR_i$>ZCR threshold, or;
(c) voice counter≦Tvc and $E_i$ is twice the average E and $ZCR_i$>the ZCR threshold. otherwise the state machine will move to transition state 43.

Figure 8A:
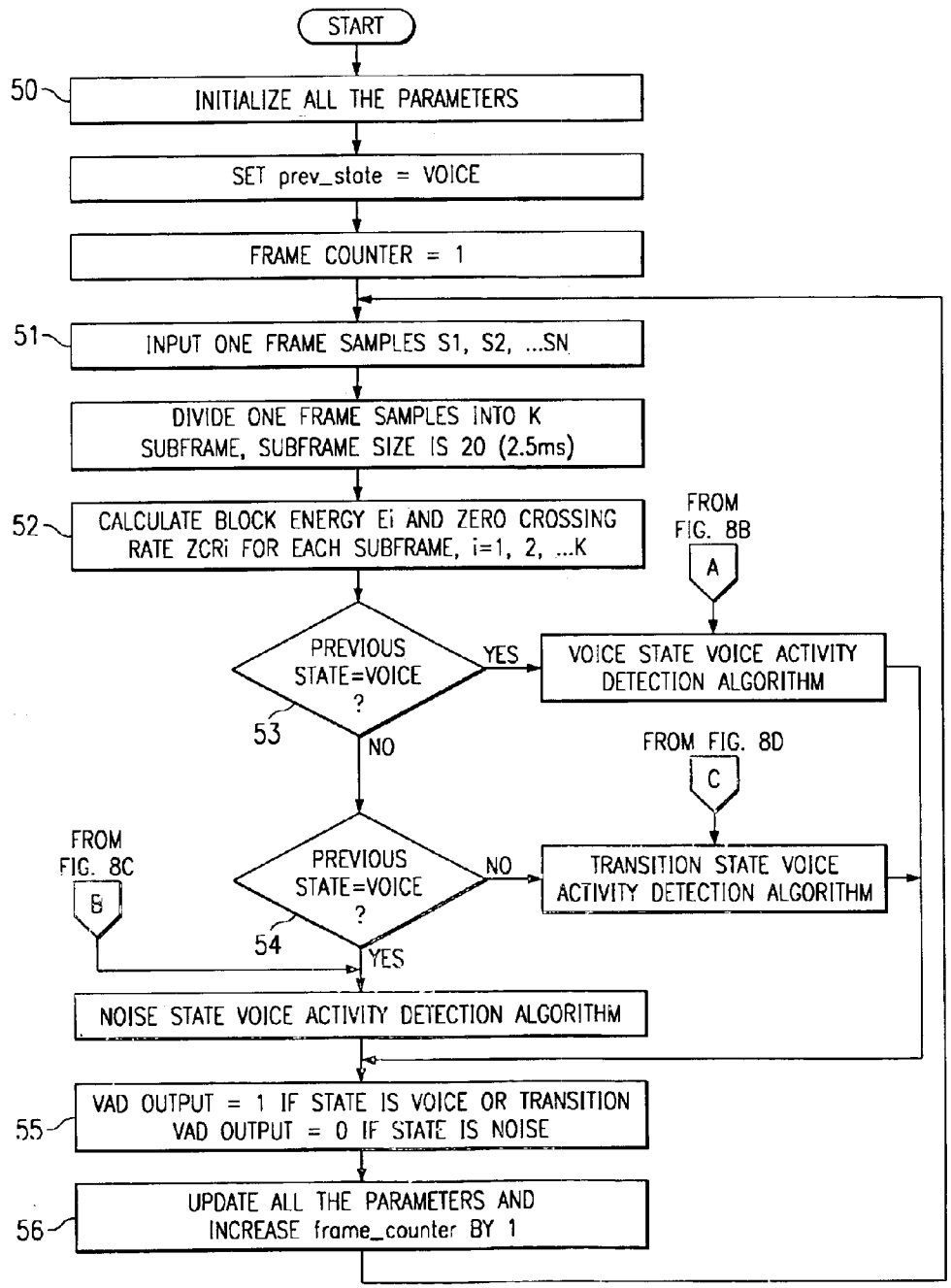

Referring to FIG. 8A, the VAD state machine implemented in the DSP or core software, begins it initial determination by initialization of a number of parameters 50. The high power level threshold $T_{high}$ is set to a level wherein signals above the level can be classified as voice with great confidence. The lower power level threshold $T_{low}$ is set to a level wherein signals below this level can be classified as noise with a great degree of confidence. A threshold for zero crossing rate is established and all counters are reset. The state machine is initially set to voice state and the frame counter is set to 1.

The VAD then accepts the current frame of samples 51, divides the frames into subframes or blocks (2.5 ms in the exemplary embodiment) and determines block energy $E_i$ and zero crossing rate $ZCR_i$ for each sub-frame i and determines the average $E_i$ for each frame. The mean sub-frame $E_i$ for each frame and mean sub-frame $ZCR_i$ is also calculated. The state machine then determines the previous state in steps 53 or 54 and process the current frame accordingly as illustrated in FIG. 8B VAD voice state, 8C VAD noise state and 8D VAD transition state. Upon return, 55, the VAD output is set to 1 for voice or transition state and is set to 0 for noise state. The parameters and frame counter are updated 56 and the next frame samples are input 51.

As illustrated in FIG. 8B, the values for the block energy $E_i$ and the zero crossing rate $ZCR_i$ vectors for the current frame are input. The VAD voice state algorithm first determines, if any $F_i$ is above the high threshold Th. If any $E_i$ is greater than $T_{high}$ than the VAD will remain in voice state 41 and flow will return to block 55 in FIG. 8A. If all $E_i$ are less than or equal to $T_{low}$, than the VAD will move to transition state 43 and flow will return to block 55 in FIG. 8A. If $E_i$ is between $T_{high}$ and $T_{low}$, then the algorithm will determine if the voice counter threshold and zero crossing rate threshold have been exceeded. If both have been exceeded, the state will remain voice and flow will return to block 55. If only the zero crossing threshold has been exceeded and the voice counter threshold has not been exceeded, the algorithm compares the current energy $E_i$ to the average energy $E_{avg}$ and if the current power level is twice the average or greater then the VAD remains in voice state 41, otherwise the VAD moves to transition state As illustrated in FIGS. 7 and 8D, once in the transition state 43, the VAD can remain in transition state, move to voice state, or move to noise state. The transition state VAD algorithm, as illustrated in FIG. 8D, receives the same power vectors and first 70 determines if any of the individual $E_i$ values of the sub-frames exceeded Th. If any subframe exceeds $T_{high}$ the VAD moves to voice state 41. It is important to move to voice state if any sub-frame exceed $T_{high}$ to avoid valid voice signal being classified and discarded as noise. Alternatively, if the $E_i$ of all sub-frames are below $T_{low}$, 71, then the VAD moves to noise state 45 because the frame is confidently classified as noise if the transition time is longer than its threshold hangover time. The VAD can either remain in transition state or move directly to voice or noise state.

If the $E_i$ of some of the sub-frames are between the high and low thresholds $T_{high}$ and $T_{low}$, and the means $E_i$ is more than twice the average E and more than two $ZCR_i$ are above the threshold ZCR 72, the VAD also moves to voice state 41. If the $E_i$ of some of the sub-frames are between the high and low thresholds $T_{high}$ and $T_{low}$, and the transition count is greater than the transition hangover threshold, 73 or the voice count is greater than the voice count short threshold 74 or the threshold for steady noise 75, the VAD moves to noise state 41. If not, the VAD remains in transition state and passes signals as voice.

As illustrated in FIG. 8C if all $E_i$ is less than $T_{high}$ and the zero crossing rate is less than the zero crossing rate threshold, 61, the VAD noise state algorithm will compare the mean value of Ei to the average value of Ei, 62. If the mean Ei is less than four times the average Bi than the VAD will remain in noise state 43. If the mean Bi is greater than four times the average Bi than the VAD will move to the voice state 41.

If, at block 61, Ei is not between the two thresholds or the zero crossing rate is greater than the zero crossing rate threshold, the noise count will be compared to the noise count threshold at 63. If the noise count has reached the noise count threshold "noise ct short" 63 and the mean Bi for the frame is greater than the high threshold Th, 65, and the mean Bi is greater than twice the average Ei of the previous E, 66 than the VAD moves to voice state 41. If the relationship between the mean Bi, average Bi and previous B does not move the VAD into voice state, the relationship between ZCR and average or mean energy will determine if the VAD moves to voice state.

Signals produced by voice and noise typically have different characteristics. Voice typically has a greater power level than noise. However, quiet voice can have a power level close to or within the typical range of noise. Voice will however have a greater fluctuation. Therefore the present invention measures not only current power but average and mean power. This can reduce the clipping of the beginning or end of voice which can be at a lower power than sustained voice, It also can reduce the classification of random noise as voice.

The zero crossing rate is also a feature of the signals which can be used by the present invention. Typically the zero crossing rate for most voice is low and the zero crossing rate for noise is higher. The zero crossing rate for some speech such as consonants is higher than that for noise, while the power level can be lower. These elements of speech can be referred to as un-voice voice By tracking the zero crossing rate and the distribution, average and mean, a better differentiation between noise and voice can be achieved by the present invention.

For background noise or white noise the average power remains fairly constant as well as remaining fairly low. For active speech, the average power typically exhibits great variance. Typically voice, active speech, is combined with un-voice, those aspects of speech which exhibit non-typical characteristics or features. this combination produces a feature set of greater variance in characteristics, including power level and zero crossing rate. This difference between speech and background noise is utilized by the present invention to assist in the VAD decisions.

By distinguishing voice activity from noise activity, certain signals identified as noise can be excluded from further processing. By excluding signals from the comparison process, processing resources can be conserved.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A system that uses voice activity detection to facilitate speaker tracking in a distributed conferencing system, comprising:

a system communication bus;

a plurality of nodes connected to said system communication bus, each of said plurality of nodes operating as a local node or a non-local node, said local node comprising:

a voice activity detector module including a plurality of voice activity detectors for receiving signals from each of a plurality of corresponding local participants connected to said local node and for classifying said signals as voice or noise based upon analysis of measured features of said signals, and for producing an indication of a classification of each of said signals;

a feature extraction module including a plurality of feature extractors, each of said feature extractors being connected to a corresponding voice activity detector and to local participant signals for measuring at least one feature of each of said local participant signals classified as voice;

a single core speaker tracker, connected to said feature extractor module and said local participant signals for determining a number of signals for speaker tracking within said local participant input signals by comparison of said feature; and a multi-core speaker tracker, connected to an output of said single core speaker tracker, for comparing measured features from said non-local node received via said system communication bus with said measured features from said local participant signals to determine, which signals from said local participant signals and signals from said non-local node will be transmitted to participants of said local node.

2. A system that uses voice activity detection to facilitate speaker tracking in a distributed conferencing system according to claim 1, wherein each of said plurality of voice activity detectors includes three states: voice, transition, and noise, and the state is dependent upon the measured features of said signal.

3. A system that uses voice activity detection to facilitate speaker tracking in a distributed conferencing system according to claim 2, wherein each of said plurality of voice activity detectors uses:

a high threshold to identify voice activity; and a low threshold to identify noise.

4. A system that uses voice activity detection to facilitate speaker tracking in a distributed conferencing system according to claim 2, wherein:

a transition state is interposed in a path from a voice state to a noise state but not in a path from said noise state to said voice state.

5. The system that uses voice activity detection to facilitate speaker tracking in a distributed conferencing system of claim 1, wherein said measured features include:

a measure of energy levels of said signals.

6. The system that uses voice activity detection to facilitate speaker tracking in a distributed conferencing system of claim 1, wherein said measured features include at least one of:

a measure of energy levels of the signals;

a measure of rates of change of the energy levels of the signals;

a measure of a range of the energy levels of the signals;

a measure of zero crossing rates of the signals; and a measure of a range of zero crossing rates for the signals.

7. The system that uses voice activity detection to facilitate speaker tracking in a distributed conferencing system of claim 6, wherein:

said classifying said signals as voice or noise includes classifying said signals having high energy levels and low zero crossing rates as voice, and classifying said signals having low energy levels and high zero crossing rates as noise.

8. The system of claim 6, wherein:

said classifying said signals as voice or noise includes classifying said signals having a high variance in energy and a high variance in zero crossing rates as voice, and classifying said signals having low variance in energy and low zero crossing rates as noise.

9. The system of claim 6, wherein:

said classifying said signals is dependent upon a comparison of a distribution of long term and short term characteristics by analysis of signal distribution.

10. A method that uses voice activity to facilitate speaker tracking in a distributed conferencing system, comprising:

measuring features of signals received from each of a plurality of local participants connected to one of a plurality of nodes connected by a system communication bus, in which each of said plurality of nodes is either a local node or a non-local node;

classifying each of said signals as voice or noise by a voice activity detector, based upon analysis of the measured features of the signals;

extracting features from each of said signals and measuring at least one feature of each of said local participant signals classified as voice;

determining a number of signals for speaker tracking within said local participant signals by comparison of said measured features; and comparing measured features from said non-local node received via said system communication bus with said measured features from local participant signals to determine, which signals from said local participant signals and signals from said non-local mode will be transmitted to participants of said local node.

11. The method of claim 10, wherein said classifying includes:

comparing current energy levels of each of said signals to a high threshold and to a low threshold; and comparing previous energy levels to current energy levels of said signals.

12. The method of claim 11, wherein said classifying by a voice activity detector includes three states: voice, transition, and noise, and further including:

classifying said signals as voice if said current energy levels exceeds said high threshold, and;

classifying said signals as noise if said current energy levels are below said low threshold, classifying said signals having a current energy level between said high threshold and said low threshold dependent upon previous energy levels of said signals and zero crossing rates of said signals.

13. The method of claim 12, further comprising:

retaining a voice classification for said signals having a previous frame energy level above said high threshold and a current energy level below said high threshold;

characterizing a state of said voice activity detector as a transition state when a voice state is retained while said current energy level is below said high threshold.

14. The method of claim 12, further comprising:

establishing a voice threshold for zero crossing rates;

retaining a voice classification for signals having previous frame energy levels above said high threshold and current energy levels below said high threshold;

characterizing a state of said voice activity detector as a transition state when said current energy levels are below said low threshold;

maintaining a voice state of said voice activity detector when said current energy levels are between said low threshold and said high threshold and said voice threshold for zero crossing rates has been exceeded and the current energy level is at least twice the average energy level of said signals.

15. The method of claim 13, further comprising:

moving a state of said voice activity detector from said transition state to said voice state when energy level of said signals in the next frame exceeds said high threshold; and characterizing a state of said voice activity detector as noise when the energy level of said signals in the next frame is below said low threshold.

16. The method of claim 14, further comprising:

moving a state of said voice activity detector from said transition state to said voice state when the energy level of said signals in the next frame exceeds said high threshold; and characterizing a state of said voice activity detector as noise when the energy level of said signals in the next frame is below said low threshold.

17. The method of claim 10, wherein said measuring features includes:

measuring energy levels of the signals;

measuring rates of change of energy levels of the signals;

measuring ranges and average energy levels of the signals;

measuring the zero crossing rates of the signals; and measuring ranges of the zero crossing rates for the signals.

18. The method of claim 10, wherein the classifying includes:

classifying signals having high energy and low zero crossing rates as voice; and classifying signals having low energy and high zero crossing rates as noise.

19. The method of claim 10, wherein said classifying includes:

classifying signals having a high variance in energy and a high variance in zero crossing rates as voice; and classifying signals having low variance in energy and zero crossing rates as noise.

* * * * *